US011332166B2

(12) United States Patent
Mohr et al.

(10) Patent No.: US 11,332,166 B2
(45) Date of Patent: May 17, 2022

(54) CABLEWAY WITH LOCK MONITORING FOR A VEHICLE

(71) Applicant: Innova Patent GmbH, Wolfurt (AT)

(72) Inventors: Clemens Mohr, Wolfurt (AT); Daniel Pfeifer, Sankt Anton am Arlberg (AT)

(73) Assignee: Innova Patent GmbH, Wolfurt (AT)

( * ) Notice: Subject to any disclaimer, the term of this patent is extended or adjusted under 35 U.S.C. 154(b) by 214 days.

(21) Appl. No.: 16/621,735

(22) PCT Filed: Jun. 11, 2018

(86) PCT No.: PCT/EP2018/065269
§ 371 (c)(1),
(2) Date: Dec. 12, 2019

(87) PCT Pub. No.: WO2018/228965
PCT Pub. Date: Dec. 20, 2018

(65) Prior Publication Data
US 2020/0101986 A1   Apr. 2, 2020

(30) Foreign Application Priority Data

Jun. 12, 2017   (AT) ............................... A50487/2017

(51) Int. Cl.
*B61B 12/06*         (2006.01)
*E05F 15/40*         (2015.01)
(Continued)

(52) U.S. Cl.
CPC ................ *B61B 12/06* (2013.01); *B61B 7/00* (2013.01); *B61B 12/002* (2013.01); *E05F 15/40* (2015.01);
(Continued)

(58) Field of Classification Search
CPC ......... B61B 12/06; B61B 7/00; B61B 12/002; B61B 12/005; B61B 11/00–008;
(Continued)

(56) References Cited

U.S. PATENT DOCUMENTS 3,844,223 A * 10/1974 Brian ...................... B61B 12/06
                                                            104/173.2
8,635,958 B2 * 1/2014 Beck ...................... B61B 12/06
                                                            104/117.1
(Continued)

FOREIGN PATENT DOCUMENTS

AT          7001 U1      7/2004
CN       1482031 A       3/2004
(Continued)

OTHER PUBLICATIONS

Indian Office Action with Translation; Application No. 201937052952; dated Jan. 28, 2021; 7 Pages.
(Continued)

*Primary Examiner* — Zachary L Kuhfuss
*Assistant Examiner* — Cheng Lin
(74) *Attorney, Agent, or Firm* — Whitmyer IP Group LLC

(57) ABSTRACT

In order to be able to reliably prevent the departure of a vehicle without a locking of the closure device in a cableway with a locking monitor, a second receiving device is provided in the movement direction of the vehicle after the first receiving device. After the start of the vehicle in the first station, the transponder of the vehicle enters the effective range of the second receiving device, and the transponder transmits a signal with the locking state to the second receiving device. The cableway is stopped before the vehicle leaves the first station when the signal to the second receiving device indicates a faulty lock mechanism.

15 Claims, 1 Drawing Sheet

(51) Int. Cl.
*B61B 7/00* (2006.01)
*B61B 12/00* (2006.01)
*H04W 4/42* (2018.01)

(52) U.S. Cl.
CPC ..... *E05Y 2400/44* (2013.01); *E05Y 2900/531* (2013.01); *H04W 4/42* (2018.02)

(58) Field of Classification Search
CPC ...... E05F 15/40; H04W 4/42; E05Y 2400/44; E05Y 2900/531; E05B 2047/0048; E05B 2047/0067
See application file for complete search history.

(56) References Cited

U.S. PATENT DOCUMENTS

| | | | | |
|---|---|---|---|---|
| 8,710,977 B2* | 4/2014 | Gubler | ............. | B61B 12/06 340/539.1 |
| 10,213,700 B2* | 2/2019 | Cylvick | ............. | B61B 12/002 |
| 2004/0003751 A1* | 1/2004 | Albrich | ............. | B61B 12/002 104/27 |

FOREIGN PATENT DOCUMENTS

| | | | | |
|---|---|---|---|---|
| CN | 101174307 A | 5/2008 | | |
| CN | 103192853 A | 7/2013 | | |
| CN | 103842218 A | 6/2014 | | |
| EP | 0392938 A1 | 10/1990 | | |
| EP | 2067682 A1 * | 6/2009 | ........... | B61B 12/002 |
| EP | 2067682 A1 | 6/2009 | | |
| EP | 2155527 A1 | 2/2010 | | |
| EP | 2155527 B1 | 12/2010 | | |
| EP | 2977286 A1 * | 1/2016 | ............. | B61B 12/06 |
| RU | 2516858 C2 | 5/2014 | | |
| WO | 2008138154 A1 | 11/2008 | | |
| WO | 2016139692 A1 | 9/2016 | | |

OTHER PUBLICATIONS

Russian Offie Action Application No. 2019144071 dated Jun. 25, 2020 4 pages.
Chinese Office Action; Application No. 201880039033.3; dated Aug. 18, 2020; 15 Pages.
Austrian Office Action Application No. A 50487/2017 Completed: May 15, 2018; dated Jun. 19, 2018 2 Pages.
International Preliminary Report on Patentability Application No. PCT/EP2018/065269 Completed: Jun. 3, 2019 7 Pages.
International Search Report and Written Opinion of the International Searching Authority Application No. PCT/EP2018/065269 Completed: Sep. 14, 2018; dated Sep. 21, 2018 11 Pages.
International Search Report Translation Application No. PCT/EP2018/065269 Completed: Sep. 14, 2018; dated Sep. 21, 2018 2 Pages.

* cited by examiner

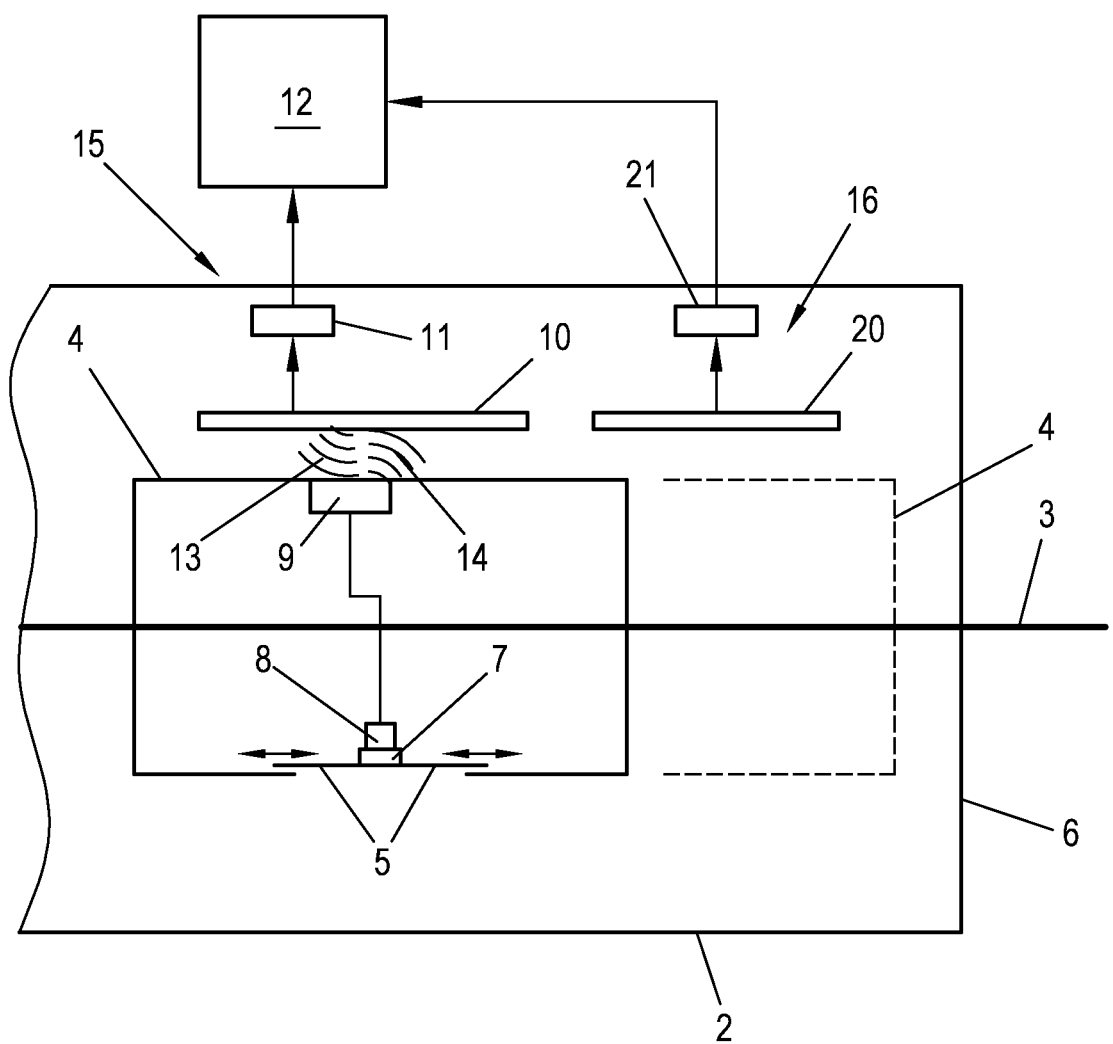

CABLEWAY WITH LOCK MONITORING FOR A VEHICLE

TECHNICAL FIELD

The present teaching relates to a cableway having a first station and a second station, wherein at least one vehicle is moved between the first station and the second station, wherein a closure device, a locking unit, and a locking monitor are provided on the vehicle, wherein the closure device closes the vehicle in the first station, the locking unit locks the closed closure device, and the locking monitor monitors the locking state and transmits said state to a transponder arranged on the vehicle, which transmits the locking state with a signal to a first receiving device arranged in the first station. The present teaching further relates to a method for operating such a cableway.

BACKGROUND

Cableways are frequently used for transporting people. For this purpose, a number of cable-drawn vehicles of the cableway are moved between at least two stations. Typical cableways are aerial cableways with vehicles suspended in the air on a support or hoisting cable, such as gondolas, cabins or chairs, or rail cableways with cable-drawn vehicles traveling on rails or other guideways. Vehicles of a cableway typically comprise closure devices, such as doors, typically in the case of gondolas, cabins or rail vehicles, or restraining bars, typically for chairs, which are designed to prevent people being transported from leaving the vehicle between stations. For this purpose, the closed closure devices are also locked in the stations before departure and the locked state is monitored to prevent inadvertent or improper opening of the closure device. The vehicle can leave the station only when the locked state is confirmed. Common lock mechanisms are mechanical lock mechanisms, for example, a catch, a latch or a detent that engages when the closure device is closed. The engaging state is also frequently mechanically tested or scanned, for example, by means of a roller lever. However, these purely mechanical solutions are mechanically elaborate, sensitive with regard to adjustments, and can also lead to an unintentional faulty operation. For example, the user may make the mistake of simply resetting the mechanical device of the lock mechanism without locking the door.

Therefore, electronic or electrical locking monitors have become known.

For example, EP 2 155 527 B1 describes a locking monitor, in which a sensor on the vehicle detects the position or the state of the lock mechanism. The sensor is connected to the vehicle with a passive transponder antenna (i.e., without a voltage supply). In the station, a transmitting antenna is arranged, which the transponder antenna of the vehicle passes when the vehicle leaves the station. The transmitting antenna transmits a query signal which is inductively transmitted to the transponder antenna. The state of the lock mechanism is transmitted to the transmitting antenna by the transponder antenna in response to the query signal and evaluated. If the closure device is not locked, the departure of the vehicle from the station is prevented.

EP 2 067 682 B1 describes a locking monitor, in which a transceiver unit is arranged on the vehicle, which is connected to the lock mechanism and transmits the locking state. When the vehicle is located in the station, the transceiver unit on the vehicle receives a first signal from a stationary transmitter unit in the station. The vehicle transmits a locking status to a stationary receiving unit of the station by means of a signal transmitted by means of the transceiver unit on the vehicle. When the lock mechanism is activated, the vehicle leaves the station and the transceiver unit on the vehicle continues to transmit the locking status to the stationary receiving unit of the station. This signals that the closure device was locked when the vehicle left the station. However, for this purpose, the vehicle must have an active transmitting antenna, which requires a power supply of the transmitting antenna on the vehicle. Since a reliable power supply on the vehicle is technically elaborate for cableways, particularly for aerial cableways (because energy storage devices must be accommodated and carried along in the vehicle, which must also be charged in the station, in the depot, or during the ride) and thus disadvantageous, it is more preferable to avoid a power supply on the vehicle.

If the closure device is not locked, the departure from the station must be prevented for safety reasons. If not correctly locked, the operating personnel of the cableway generally receives an error message and the cableway is stopped. The operating personnel must subsequently check the closure device of the vehicle prior to its departure and acknowledge the error message after checking or eliminating the error. The cableway can be restarted and the vehicle can leave the station only after the error message is acknowledged. However, in practice, it has been shown that the operating personnel, particularly in stress situations, can make a mistake and only insufficiently check such an error, not correct the error, or even acknowledge the error message without checking, which results in the vehicle leaving the station without a locked closure device. Neither the locking monitoring of EP 2 067 682 B1 nor of EP 2 155 527 B1 can prevent this. EP 2 067 682 B1 would at least still provide the information that the vehicle has left the station without being locked. However, no actions for such an event are mentioned in EP 2 067 682 B1. In the best case, the cableway could be stopped if the vehicle has already left the station.

SUMMARY

The present teaching therefore addresses the problem of providing a cableway with a locking monitor, and a corresponding method, with which the departure of a vehicle without a locked closure device can be reliably prevented.

This problem is solved in that, a second receiving device is provided in the movement direction of the vehicle after the first receiving device, and, after the start of the vehicle in the first station, the transponder of the vehicle enters the effective range of the second receiving device, and the transponder transmits a signal with the locking state to the second receiving device, and that the cableway is stopped before the vehicle leaves the first station when the signal to the second receiving device indicates a faulty lock mechanism. In such case, the cableway is stopped by a control unit of the cableway, which is in communication with the second receiving device and receives the locking state from the second receiving device. In this manner, it is ensured that the departure of a vehicle from the station with a faulty locking is prevented, even if a first-time error message of the locking was acknowledged due to an error, resulting in the start of the vehicle. By stopping in the area of the station, the lock mechanism can easily be checked by the operating personnel and/or the passengers can be prompted to exit the faulty vehicle. It is thus possible to prevent a dangerous condition caused by a vehicle with an open lock mechanism on the route between the two stations.

A simple, low-cost implementation is made possible on the basis of an electromagnetic signal (radio) in that a receiving device is provided with a transmitting antenna which is connected to a first evaluation unit, and the transponder sends the signal to the transmitting antenna if the transponder receives a query signal of the transmitting antenna. Particularly advantageous for this purpose is the use of commercially available RFID technology.

If, in addition, a passive transponder is used which recovers the energy for transmitting the signal from the query signal, it is also possible to avoid a separate, elaborate energy supply of the transponder on the vehicle.

It is particularly advantageous if, in the event of a faulty locking, the vehicle is stopped in the station in the effective range of the second receiving device. This ensures that the vehicle cannot be started as long as the faulty locking state continues. As a result, a very high degree of safety can be achieved in a simple manner.

In the case of a faulty locking, the vehicle can alternatively also be returned to the effective range of the first or the second receiving device. The departure of a vehicle with a faulty locking can thus also be safely prevented.

BRIEF DESCRIPTION OF THE DRAWINGS

In the following, the present teaching shall be described in more detail with reference to FIG. 1 which, by way of example, shows schematic and non-delimiting advantageous embodiments of the present teaching.

FIG. 1 shows a station of a cableway with a vehicle.

DETAILED DESCRIPTION

In FIG. 1, a first station 2 of a cableway 1 is indicated. The cable 3 of the cableway 1 is also merely indicated. Well-known devices of the cableway 1 in the station 2, such as a cable pulley for the cable 3, a drive or tensioning device for the cable pulley, etc., and on the track, for example, lift pylons with support rollers for the cable, etc., or a second station are not depicted because they are not relevant to the present teaching. With the cable 3, at least one vehicle 4 is transported between the first station 2 and a second station (not depicted). For this purpose, in a well-known manner, the vehicle 4 can be permanently coupled to the cable 3 or can be decoupled from the cable 3 by means of spring-actuated detachable grips. The connection of the vehicle 4 to the cable 3, for example, in the form of a carriage with a hanger, is also known and therefore not depicted. In the following, the present teaching shall be described without loss of generality by the example of a cabin as the vehicle 4 and with sliding doors as a closure device 5.

In the station 2, the closure device 5 is opened to allow the exiting and boarding of passengers. For that purpose, the vehicle 4 can be stopped in the station 2 or be moved through the station 2 at a low speed. Before the exit 6 of the station 2, the closure device 5 is closed, for example, via a mechanism which is activated by the movement of the vehicle 4. On the vehicle 4, a locking unit 7 is provided, with which the closure device 5 is locked, and so an inadvertent or improper opening of the closure device 5 is prevented. The locking can also be affected mechanically. Furthermore, the vehicle 4 is provided with a locking monitor 8 which detects the state of the locking unit 7. The locking monitor 8 is preferably designed as a sensor, for example, as a limit switch with double contact (NC contact, NO contact), which detects the state of the locking unit 7, i.e., whether it is locked or not.

The locking monitor 8 is connected to a transponder 9 on the vehicle 4, which can transmit a signal containing information regarding the locking state. The signal transmitted by the transponder 9 can be received and evaluated by a receiving device 15, which is arranged in the station 2, in order to detect the locking state of the locking unit 7. The receiving device 15 is connected to a control unit 12 of the cableway 1 and can forward the locking state to the control unit 12.

In a preferred embodiment, the transponder 9 is designed as a radio transponder, and the receiving device 15 is designed as a first transmitting antenna 10 with an evaluation unit 11 connected thereto, wherein the evaluation unit 11 is connected to the control unit 12 of the cableway 1. The transmitting antenna 10 is preferably an antenna elongated in the movement direction of the vehicle 4 in order to be able to receive a signal from the transponder 9 over a large travel range of the vehicle 4. The transponder 9 is preferably a passive transponder 9 without its own energy supply. In this case, the transponder 9 obtains the required energy from a query signal 13, which is emitted by the transmitting antenna 10, when the transponder 9 is in the effective range of the transmitting antenna 10. The transponder 9 can have a sensor input which can be connected to an external sensor as the locking monitor 8 in order to query in such case the state of the locking monitor 8. In the case of a limit switch as the sensor, it is sufficient if the transponder 9 can read two contacts.

In a particularly advantageous embodiment, the transponder 9 is an RFID (radio-frequency identification) transponder (often also called RFID tag), preferably a passive RFID transponder. In this case, the evaluation unit 11 is an RFID receiving device that emits electromagnetic waves via the transmitting antenna 10 as the query signal 13. The passive RFID transponder obtains the electric energy for operating the RFID transponder from the received electromagnetic waves. Such RFID transponders, also with a sensor input, are commercially available components, as are the RFID receiving device as the evaluation unit 11 or an RFID antenna as the transmitting antenna 10.

The preferred wireless communication between the receiving device 15 and the transponder 9 can naturally also be established in other ways, for example, by means of a laser, infrared, ultrasound, etc., wherein the transponder 9 can in such case possibly not be designed as a passive transponder. The receiving device 15 is then designed correspondingly in order to be able to receive a signal from the transponder 9.

The transmitting antenna 10, or the receiving device 15 in general, is arranged in the area of the station 2, in which the closure device 5 of the vehicle 4 is closed. In this area, the receiving device 15 receives the signal from the transponder 9. In the case of a transmitting antenna 10, the transmitting antenna 10 sends a query signal 13 to the transponder 9, which is located in the effective range of the transmitting antenna 10 and which responds with a signal 14, with which the state of the locking monitor 8 is transmitted. The transmitting antenna 10 forwards the received signal 14 to the evaluation unit 11 which decodes the received locking information from the signal 14 and forwards it to the control unit 12.

If the locking of the closure device 5 is confirmed, the vehicle 4 can exit the station 2. If it is indicated that the locking has not been carried out correctly, the cableway 1 is stopped. The cableway 1 can be restarted and the vehicle 4 can exit the station 2 only when this error message is acknowledged by the operating personnel.

In order to prevent the vehicle 4 from exiting the station 2 despite an incorrectly locked closure device 5 due to an operating error or another error, a second receiving device 16 is arranged in the station 2 before the exit 6 and in the movement direction of the vehicle 4 after the first receiving device 15. The second receiving device 16 is again designed, for example, as a second stationary transmitting antenna 20 with a second evaluation unit 21 connected thereto. The second receiving device 16 is again connected to the control unit 12 of the cableway 1. Of course, it is also possible that only one receiving device, or only one evaluation unit, is used for both transmitting antennas 10, 20, which consequently evaluates both signals. A receiving device 15, 16 or an evaluation unit 11, 21 could also be integrated in the control unit 12 of the cableway 1 and therefore does not have to be present as a separate component.

When the vehicle 4 accelerates towards the exit 6, the transponder 9 on the vehicle enters the effective range of the second receiving device 16, for example, the transmission range of the second transmitting antenna 20, which again transmits a query signal 13. The transponder 9 again transmits the signal 14 with the locking information of the locking monitor 8, which is received by the second receiving device 16 and forwarded to the control unit 12. The received locking information is evaluated in the control unit 12. If an incorrect locking of the locking unit 7 is detected, the cableway 1 is stopped immediately in order to prevent the vehicle 4 from exiting the station 2. For this purpose, the second receiving device 16 is arranged in the station 2 such that the vehicle 4 can still be stopped safely in the station 2 despite the acceleration already underway (indicated in FIG. 1 by the dashed vehicle 4).

Most advantageously, the second receiving device 16 is arranged and designed such that the vehicle 4 is still stopped in the effective range of the second receiving device 16 in the event of improper locking. In the case of a second receiving device 16 with a second transmitting antenna 20, the second transmitting antenna 20 is preferably elongated in the movement direction of the vehicle 4 in order to obtain a long effective range. Since the vehicle 4 is thus in the effective range of the second receiving device 16, the vehicle 4 cannot be restarted as long as the locking is not done properly and was reported. Even if an operator of the cableway 1 were to acknowledge an error message resulting from a missing locking, the error state would be maintained and continue to be detected by the second receiving device 16 and transmitted to the control unit 12. As a result, the control unit 12 continues to prevent the restart of the vehicle 4 as long as the closure device 5 is not locked.

If the second receiving device 16 triggers an error message because of improper locking, the operator preferably has to execute the following steps:
a) Remedy the error state, for example, remove an object that has prevented the closing and locking of the closure device 5.
b) Manually close and lock the closure device 5.
c) Acknowledge the error message.
d) Restart the cableway 1.

Since the vehicle 4 is still in the effective range of the second receiving device 16, this simple procedure is possible. The vehicle 4 is thus certainly still in the station 2 and passengers can still get off in the station 2 if necessary. Even if the operating personnel makes a mistake, the vehicle 4 will nevertheless not start.

Even if the vehicle 4 is stopped outside of the effective range of the second receiving device 16, but at least in the station 2, a departure of the vehicle 4 from the station 2 can be prevented. In such case, different measures can be provided. For example, an error message can be issued which is again triggered by the second receiving device 16 and which must be acknowledged again by the operating personnel before the cableway 1 is restarted. Since a second error message is issued within a short time, it can be assumed that the operating personnel will now probe the cause of the error more thoroughly. However, it could also be provided that the vehicle 4 must again be returned to the area of the second receiving device 16, or even of the first receiving device 15, before the error message can even be acknowledged. In this case, the vehicle 4 would be stopped again during the restart when the locking monitor 8 still indicates an improper locking. In this case, it would also be impossible for an unlocked vehicle 4 to leave the station 2.

If the error persists and cannot be corrected, then the vehicle 4, which triggers the error, could be taken out of the current operation in order to be able to restart the cableway 1 without the vehicle 4.

The receiving devices 15, 16, for example, the transmitting antennas 10, 20 with the evaluation units 11, 21, and the transponder 9 on the vehicle 4 are arranged at suitable locations, so that a reading of the transponder 9 is ensured. Since the transmission range of the transmitting antennas 10, 20, but primarily of a radio transponder 9, is normally very small, the transmitting antennas 10, 20 and the transponder 9 must be arranged sufficiently close.

The two receiving devices 15, 16 are preferably arranged such that their effective ranges do not overlap. This means that only one of the two receiving devices 15, 16 can receive the signal 14 of the transponder 9.

The elongated transmitting antennas 10, 20 also make it possible to perform multiple queries of the transponder 9 in order to exclude or detect a faulty communication, for example, by a disrupted wireless communication channel.

The verification of the lock mechanism of a closure device 5 of a vehicle 2 of a cableway 1 is preferably performed in each station 2, in which passengers can board. In a station, in which passengers can only exit, it is not absolutely necessary to check the lock mechanism of the closure device 5 because a vehicle 2 can only leave the station when empty, and a dangerous state due to improper locking can thus not occur. It can also be provided that the verification of the lock mechanism in a station 2 can be switched on or off by the operating personnel.

The communication path, i.e., control unit 12, receiving device 15, 16 (evaluation unit 11, 21, transmitting antenna 10, 20), transponder 9, can naturally also be designed to be functionally failsafe, for example according to a required safety integrity level (SIL), in order to ensure safe (i.e., in the sense that an error is detected immediately and the system then preferably switches to a safe state) communication in the sense of functional safety. For this purpose, well-known features, such as a multi-channel hardware, redundancy in the data, error detection and error correction methods in the data transmission, etc., can be provided. The following features could be implemented:

For example, a timestamp could be added to each signal 14 or to the data carried therein. If the time bases of a receiving device 15, 16 and the control unit 12 are synchronized, a deviation of the time stamp from the synchronized control time can be detected and, e.g., result in a shutdown of the cableway 1.

It can further be provided that, from a specific point in time, for example beginning with the closing of the closure device, a receiving device 15, 16 must receive a specific number of signals 14 within a predetermined period of time, and the content of the signals 14 must match in order to be able to assume a correct transmission of the state of the lock mechanism.

The data transmitted in the signal 14 could be secured by redundant data, for example by a CRC (cyclic redundancy code).

Of course, further measures to ensure the functional safety are also conceivable.

The invention claimed is:

1. A method for operating a cableway with a vehicle which is moved between a first station and second station of the cableway, comprising: closing a closure device of the vehicle and locking the closed closure device by a locking unit when the vehicle is in the first station, detecting a locking state of the closure device by a locking monitor, transmitting the locking state via a transponder on the vehicle to a first receiving device arranged in the first station, providing a second receiving device after the first receiving device in the movement direction of the vehicle, wherein, after the start of the vehicle in the first station, the transponder enters an effective range of the second receiving device, the transponder transmits the locking state to the second receiving device, and the cableway is stopped before the vehicle leaves the first station when a faulty locking is detected.

2. The method according to claim 1, wherein the first receiving device is-comprises a first transmitting antenna which is connected to a first evaluation unit, and the transponder transmits the locking state to the first transmitting antenna when the transponder receives a query signal from the first transmitting antenna.

3. The method according to claim 2, wherein a passive transponder is used which recovers the energy for transmitting the locking state from the query signal.

4. The method according to claim 2, wherein the transponder and the first transmitting antenna with the first evaluation unit are designed on the basis of RFID technology.

5. The method according to claim 1, wherein the second receiving device comprises a second transmitting antenna which is connected to a second evaluation unit, and the transponder transmits the locking state to the second transmitting antenna when the transponder receives a query signal from the second transmitting antenna.

6. The method according to claim 5, wherein the transponder and the second transmitting antenna with the second evaluation unit are designed on the basis of RFID technology.

7. The method according to claim 1, wherein, in case of a faulty locking, the vehicle is stopped in the effective range of the second receiving device.

8. The method according to claim 1, wherein, in case of a faulty locking, the vehicle is returned to an effective range of the first receiving device or the second receiving device.

9. A cableway having a first station and a second station, wherein a vehicle is moved between the first station and the second station, comprising: a closure device that closes the vehicle in the first station, a locking unit that locks the closed closure device, a locking monitor that monitors the locking state and transmits said state to a transponder arranged on the vehicle, which transponder transmits the locking state to a first receiving device arranged in the first station, a second receiving device is-provided in the first station in the movement direction of the vehicle after the first receiving device, wherein the cableway is configured such that after the start of the vehicle in the first station, said second receiving device is configured to receive the locking state from the transponder, wherein the transponder is configured to enter an effective range of the second receiving device, and the second receiving device transmits the locking state to a control unit of the cableway, and the control unit stops the cableway before the vehicle leaves the first station when a faulty lock mechanism is detected.

10. The cableway according to claim 9, wherein the first receiving device is designed to have a first transmitting antenna which is connected to a first evaluation unit, and the transponder transmits the locking state to the first transmitting antenna when the transponder receives a query signal from the first transmitting antenna.

11. The cableway according to claim 10, wherein the transponder comprises a passive transponder which recovers the energy for transmitting the locking state from the query signal.

12. The cableway according to claim 10, wherein the transponder and the first transmitting antenna with the first evaluation unit are designed on the basis of RFID technology.

13. The cableway according to claim 10, wherein, in case of a faulty locking, the vehicle is returned to an effective range of the first receiving device or the second receiving device.

14. The cableway according to claim 9, wherein the second receiving device is designed to have a second transmitting antenna which is connected to a second evaluation unit, and the transponder transmits the locking state to the second transmitting antenna when the transponder receives a query signal from the second transmitting antenna.

15. The cableway according to claim 14, wherein the transponder and the second transmitting antenna with the second evaluation unit are designed on the basis of RFID technology.

* * * * *